Patented Aug. 5, 1952

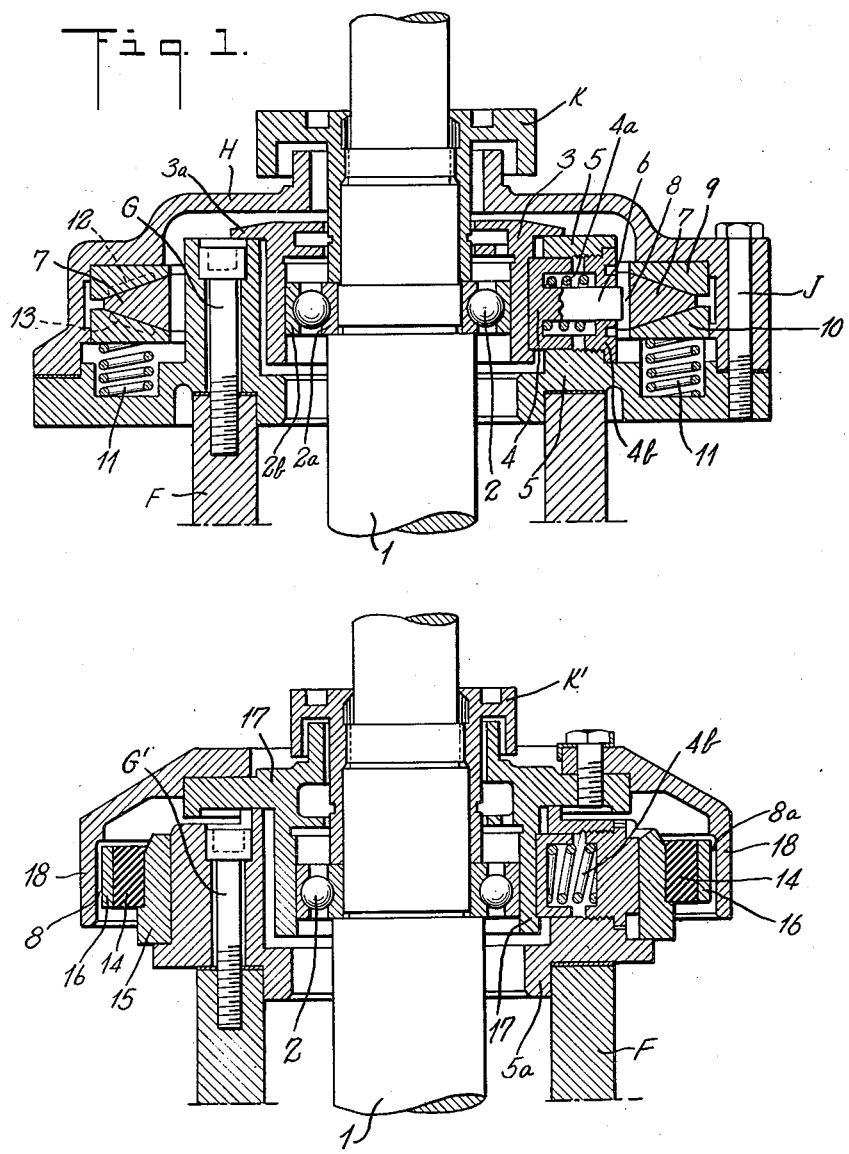

2,606,082

UNITED STATES PATENT OFFICE 2,606,082

SELF-ALIGNING VERTICAL SHAFT

Nils Edvin Svensjo, Nockeby, Sweden, assignor to Aktiebolaget Separator, Stockholm, Sweden, a corporation of Sweden Application November 10, 1947, Serial No. 785,035
In Sweden November 11, 1946

3 Claims. (Cl. 308—143)

This invention relates to centrifuges and more particularly to an improved top bearing for the spindle of a centrifugal bowl.

High speed centrifuges are generally provided with a radially elastic top bearing, which prevents the vibrations of the bowl spindle from being transmitted to the frame of the centrifuge. In this way a smooth and easy operation of the centrifuge is obtained. The vibrations of the spindle are due to some unbalance remaining in the bowl after it has been balanced. The springing and dampening of the top bearing are such that even the lateral deviations of the spindle when it is passing the most critical speed, are entirely absorbed by the spring system of the bearing. The ability of absorbing vibrations is due not only to the elasticity of the spring system of the bearing but also to the dampening which is caused by the friction between the different parts of the spring system or by the interior friction of a rubber ring, or the like, serving as the elastic element. The ordinarily existing dampening factor is quite sufficient for the absorbing of all radial movements due to normal unbalance of the bowl.

Under certain circumstances, however, the bowl may acquire a greater unbalance than usual. The radial movements of the spindle will then have greater energy than is normally the case, and the dampening effect of the top bearing is not sufficient to absorb and dissipate the whole amount of energy, with the result that the solid parts of the top bearing will collide and very strong vibrations will be transmitted to the centrifuge frame, involving risks of deformation or breaking of important parts of the centrifuge.

The unusually large deviations of the spindle can, of course, be counteracted and the energy of the radial movements absorbed by a materially increased dampening of the top bearing. Tests along this line have been made but have not given satisfactory results. A top bearing of this kind has proved to transmit the normally occurring vibrations to the frame in such a way that the running has been stiff. As a matter of fact, a top bearing with strong dampening will, if special precautions are not taken, be a stiff top bearing, that is, its elastic qualtities will approach those of a rigid bearing. This stiffness of the top bearing involves, in addition to the stiff running, a considerably increased wearing, because the forces developed in the bearing will be considerably larger than normally. In addition, the forces transmitted to the frame are a drawback. An adequate increase of the dampening at the bearing has therefore not proved to be an acceptable way of solving this problem.

One object of the present invention resides in the provision of a top bearing assembly for centrifugal bowls, which overcomes the above-noted difficulties.

Another object is to provide an improved top bearing assembly of simple and a compact construction which, by a radial spring action, absorbs the vibrations of the bowl spindle so as to prevent their transmission to the centrifuge frame, the assembly being of a unitary character whereby it can readily be installed or removed.

According to the preferred form of the invention, the bearing assembly includes a dampening system which is effective at all times to absorb the spindle vibrations, and a second and stronger dampening system cooperating with the first one but which does not function until the deviations of the spindle (the radial movements) have exceeded a certain normal amount. Thus, there is a certain margin within which the spindle and the parts which accompany it in its radial movements can move under normal conditions, so that the running of the centrifuge is smooth and easy and the forces transmitted to the frame are extremely small. Not until this margin has been exceeded does the more powerfully functioning dampening device come into action. Comparatively large forces are thereby transmitted to the frame but this can be allowed because the large unbalance occurs only occasionally, generally due to one or more of the nozzles in the outer wall of the bowl being clogged, causing the sludge to deposit on one side of the bowl. Furthermore, the abnormally large radial movements occur only when a critical speed is being passed. At normal running of the centrifuge the stronger dampening system does not cause any inconvenience because it does not function at all.

The dampening device can, with consideration to the foregoing conditions, be constructed in different ways. It has previously been attempted to increase the dampening by providing the radially movable part of the top bearing with a plane flange pressed between a plane fixed surface and a plane ring influenced by a spring. By this arrangement, an efficient retardation of the radial movements has been obtained but with a stiff running at normal use. Such an arrangement can be used when, according to the invention, the alteration is made so as to provide a sufficient clearance between the radially movable part of the top bearing and the radially movable flange. This arrangement has, however, the drawback that the position of the movable flange is not fixed, and it may disturb the running of the centrifuge in normal use because the radially movable part of the top bearing hits the movable flange if this occasionally has an eccentric position. The flange is maintained with comparatively large force in this position between the spring-actuated ring and the plane fixed surface. What is lacking in such an arrangement is an ability of the flange to return to normal position after moving sideways at strong deviations.

For a better understanding of the invention, reference may be had to the accompanying drawing, in which Fig. 1 is a vertical sectional view of one form of the new bearing assembly; and Fig. 2 is a similar view of another form of the assembly.

The bowl spindle 1 rotates in the usual way in the frame F of the centrifuge. The upper part of the spindle is surrounded and engaged by a bearing 2 having a rotating inner race 2ᵃ and a non-rotating outer race 2ᵇ. The outer race 2ᵇ fits closely in a non-rotating ring 3 which is movable radially with the bearing and the spindle. A plurality of plungers, one of which is shown at 4, are spaced around the outside of ring 3 and are slidable radially in a stationary member 5. The plungers 4, of which there are at least three, are evenly spaced around the ring 3 and engage its outer wall. Each plunger is urged inwardly against the ring by a coiled spring 4ᵃ seated against a cap 4ᵇ threaded in the stationary member 5.

A pin 6 projects from each plunger through the corresponding cap, the outer ends of the pins being normally spaced from a double-conical ring 7 to provide a clearance 8. The ring 7 is pressed between two conical rings 9 and 10 which are pressed toward each other, as by means of vertical compression springs 11 acting upon the ring 10.

The ring 3 is supported by a top flange 3ᵃ resting upon the stationary member 5 and slidable radially thereon. The member 5, in turn, rests upon the frame part F to which it is removably secured by bolts G. A cover H is secured to the member 5 by bolts J and serves to oppose the upward pressure of springs 11 against the rings 7, 9 and 10, the springs being seated in the member 5. In this way, the entire bearing assembly can be removed as a unit from the frame by simply detaching the cover H and the overlying flanged member K on the spindle, and unscrewing the bolts G.

The device functions in the following way: As long as the radial movements of the spindle and the movable bearing part 3 are kept within the limit which is determined by the clearance space 8, the rotation goes on under normal conditions. Not until the deviations become larger do the pins 6 contact the ring 7 and press this sideways. The ring 7 allows additional movement sideways but acts strongly to retard such additional movement, whereby the radial movements of the spindle and the bearing parts are strongly dampened. The conicity of the rings 7, 9, 10 is suitably chosen so that the ring 7 is moved back to normal position, as shown, by the forces of the springs 11. Thus, the ring 7 is prevented from remaining in any eccentric position and disturbing the operation of the centrifuge at normal unbalance.

The rings 7, 9, 10 should be made of such material that there is no danger of seizing of the gliding surfaces during normal running. In order to obtain sufficient strength of the material for this purpose, suitable metals and metal alloys may be used. One of the friction parts can be made of the kind of porous metal or metal alloy which is used for self-lubricating bushings. As indicated in Fig. 1, the rings 9 and 10 can be provided with inserts in the form of rings or blocks 12 and 13 made of some suitable brake-material, e. g., such as is used in brake bands or friction clutches. The parts 12 and 13 can, of course, be inserted in the ring 7 instead of the rings 9, 10. It is also possible to use solid metal against the same metal, provided that there is satisfactory lubrication of the friction surfaces.

In the embodiment of the invention shown in Fig. 2 the stronger dampening element is a rubber ring 14 placed on a metal ring 15 fixed to the member 5ᵃ on the frame F. The rubber ring 14 is covered with a metal ring 16 and encircled by a cylindrical flange 18 connected to the radially movable part 17. There is a clearance space 8ᵃ between the parts 16 and 18 of the same size and with the same function as the clearance space 8 in Fig. 1. The purpose of the metal ring 16 is to secure a predetermined and unchangeable diameter of the dampening element which comprises the rubber ring 14. This arrangement functions substantially in the same way as the arrangement shown in Fig. 1. The spindle and the radially movable part 17 of the top bearing move within a certain limit entirely independently of the dampening device including the rubber ring 14, these movements being opposed by the springs 4ᵇ. Not until abnormal deviations occur do the parts 16 and 18 engage and cause a strong dampening of the radial movements.

The movable part of the ball bearing housing does not, of course, move at right angles to the ring 7 (or the ring 14) which serves as the dampening element, but undergoes more or less a circulating movement. When the deviations become so large that contact occurs between the pins 6 and the ring 7 (or between the parts 16 and 18), the parts will therefore slide against each other. This causes a further dampening of the radial motion component of the top bearing part. This dampening can suitably be strengthened by treating the contact surfaces in such a way that the coefficient of friction is increased. One or both parts can be covered with some friction material, such as is used for brakes, clutches and the like. In this way, an increased dampening and braking of the abnormally large radial movements is obtained. It may also be desirable to provide the contact surfaces with some sound-absorbing material so that shocks between these surfaces will not cause disturbing sounds.

I claim:

1. In a centrifuge having a spindle and a frame supporting the spindle for rotation, a top bearing assembly for the spindle comprising a bearing surrounding the same, means for securing the bearing in a fixed axial position relative to the spindle, a spring dampening device surrounding the bearing and acting to oppose radial deviations thereof due to normal vibrations of the spindle, said device being yieldable radially incident to said deviations and having an annular surface surrounding the bearing and forming an axial path along which the spindle and bearing are slidable vertically relative to said device, a frictional dampening device normally inoperative upon said bearing but adapted to frictionally oppose abnormal vibrations of the spindle, said frictional damping device including means for automatically returning said device to a predetermined normal position upon resumption of said normal vibrations, and means for operatively connecting said frictional dampening device with the bearing only when said radial deviations exceed a predetermined amount, said frictional dampening device including an elastic ring concentric with the spindle axis and upon which said connecting means are operable to compress the ring radially, the ring having a high resistance to radial compression.

2. In a centrifuge having a spindle and a frame supporting the spindle for rotation, a top bearing assembly for the spindle comprising a bearing surrounding the same, means for securing the bearing in a fixed axial position relative to the spindle, a spring dampening device surrounding the bearing and acting to oppose radial deviations thereof due to normal vibrations of the spindle, said device being yieldable radially incident to said deviations and having an annular surface surrounding the bearing and forming an axial path along which the spindle and bearing are slidable vertically relative to said device, a frictional dampening device normally inoperative upon said bearing but adapted to frictionally oppose abnormal vibrations of the spindle, said frictional damping device including means for automatically returning said device to a predetermined normal position upon resumption of said normal vibrations, and means for operatively connecting said frictional dampening device with the bearing only when said radial deviations exceed a predetermined amount, said frictional dampening device including an elastic ring concentric with the spindle axis, and a metal ring covering the elastic ring, said connecting means including a flange movable radially with the bearing and normally spaced from but engageable with the metal ring.

3. In a centrifuge having a spindle and a frame supporting the spindle for rotation, a top bearing assembly for the spindle comprising a bearing surrounding the same, means for securing the bearing in a fixed axial position relative to the spindle, a spring dampening device surrounding the bearing and acting to oppose radial deviations thereof due to normal vibrations of the spindle, said device being yieldable radially incident to said deviations and having an annular surface surrounding the bearing and forming an axial path along which the spindle and bearing are slidable vertically relative to said device, a frictional dampening device normally inoperative upon said bearing but adapted to frictionally oppose abnormal vibrations of the spindle, said frictional damping device including means for automatically returning said device to a predetermined normal position upon resumption of said normal vibrations, and means for operatively connecting said frictional dampening device with the bearing only when said radial deviations exceed a predetermined amount, said frictional dampening device including an elastic ring concentric with the spindle axis, said connecting means including a flange movable radially with the bearing and operable, only when said last radial movement exceeds a predetermined amount, to compress the elastic ring radially.

NILS EDVIN SVENSJO.

REFERENCES CITED

The following references are of record in the file of this patent:

UNITED STATES PATENTS

| Number | Name | Date |
| --- | --- | --- |
| 1,816,325 | Held | July 28, 1931 |
| 1,887,315 | Lindgren | Nov. 8, 1932 |
| 2,025,787 | Stahlecker | Dec. 31, 1935 |

FOREIGN PATENTS

| Number | Country | Date |
| --- | --- | --- |
| 347,645 | Germany | Sept. 25, 1919 |
| 662,897 | France | Aug. 13, 1929 |
| 680,623 | France | May 2, 1930 |